United States Patent [19]

London

[11] Patent Number: 5,036,237

[45] Date of Patent: Jul. 30, 1991

[54] SHADED POLE MOTOR

[75] Inventor: Sol London, Ft. Wayne, Ind.

[73] Assignee: Electric Motors and Specialties, Inc., Garrett, Ind.

[21] Appl. No.: 506,949

[22] Filed: Apr. 9, 1990

[51] Int. Cl.[5] .............................................. H02K 17/10

[52] U.S. Cl. ...................................... 310/172; 310/45; 310/179; 310/254

[58] Field of Search ............... 310/172, 179, 182, 185, 310/186, 187, 194, 45, 162, 254; 318/688

[56] References Cited

U.S. PATENT DOCUMENTS

| | | | |
|---|---|---|---|
| 1,935,606 | 11/1933 | Anderson | 172/278 |
| 2,071,224 | 2/1937 | Ballentine | 310/172 |
| 2,355,175 | 8/1944 | Olving | 172/36 |
| 2,741,715 | 4/1956 | Meijer | 310/172 |
| 2,810,845 | 10/1957 | Howes | 310/172 |
| 3,020,428 | 2/1962 | Meijer | 310/172 |
| 3,697,842 | 10/1972 | Morrill | 318/221 R |
| 3,959,678 | 5/1976 | Donahoo | 310/172 |
| 3,975,654 | 8/1976 | Dryburgh | 310/172 |
| 4,234,810 | 11/1980 | Donahoo | 310/172 |

FOREIGN PATENT DOCUMENTS

| | | | |
|---|---|---|---|
| 1613071 | 4/1970 | Fed. Rep. of Germany | 310/172 |

*Primary Examiner*—R. Skudy

*Attorney, Agent, or Firm*—Pearne, Gordon, McCoy & Granger

[57] ABSTRACT

A shaded pole electric motor has a stator and a rotor interacting through an air gap. This stator has a salient pole with a narrow neck and wide pole shoe. A shading coil slot extends into the salient pole from the air gap and defines a shaded portion of the pole. The exposed side of the shaded portion is relatively smooth, as established by the shading coil having one side in the shading coil slot and another side in a shading pole aperture close to but spaced from the exposed side. This establishes ease of insulating the surface of the salient pole to receive a stator winding. The foregoing abstract is merely a resume of one general application, is not a complete discussion of all principles of operation or applications, and is not to be construed as a limitation on the scope of the claimed subject matter.

9 Claims, 2 Drawing Sheets

SHADED POLE MOTOR

BACKGROUND OF THE INVENTION

Shaded pole motors have been used for starting of small single-phase, alternating current motors, generally of the induction start, and whether induction-run or synchronous-run. The usual shaded pole motor has concentrated windings rather than distributed windings, so that there is a definite pole face which may be provided with a shaded portion. A slot leads in from the air gap between the stator and rotor to define the boundary between the shaded and unshaded sections, and a short circuiting ring surrounds the shaded section, having one coil side in the slot and one coil side on the exposed side of the pole piece, where it is present in the winding space for the stator coil. This construction is shown in U.S. Pat. Nos. 3,697,842; 3,959,678; and 4,234,810.

For safety, the exposed side of the short circuiting coil must be insulated in order to avoid a potential short on the stator coil, with its usual enamel insulation on the wire of the stator coil. This stator coil-to-ground insulation can be a preformed bobbin, as in U.S. Pat. No. 1,935,606, or it can be an insulation which is applied electrostatically or by heat and insulative powder to coat the exposed surface of the stator core, as in U.S. Pat. No. 4,234,810. Since the shading coil exposed side normally protrudes into the winding space, it is often difficult to make certain that the insulative powder, whether applied by heat or by electrostatic means, properly covers all surfaces, especially the sharp corners. It has been suggested that the shading coil be recessed into the exposed side, as in U.S. Pat. No. 2,355,175, so that the insulative bobbin has a relatively smooth surface on which to be mounted. U.S. Pat. Nos. 3,697,842 and 3,959,678 show the difficulty of properly insulating all exposed surfaces of the short circuiting shading coil and the difficulty of providing a winding behind that coil. U.S. Pat. No. 1,935,606 suggests that the shading coil be provided not in slots, but in apertures in a magnetically permeable ring for the purpose of being able to rotate the ring so that the motor is able to be started in either of the two rotational directions.

SUMMARY OF THE INVENTION

The problem to be solved, therefore, is how to construct a shaded pole motor wherein the exposed side of the shaded portion of the pole piece is relatively smooth for ease of insulation.

This problem is solved by an electric motor comprising a stator and a rotor interacting through an air gap, said stator having a salient pole with a narrow neck and a wide pole shoe, a shading coil slot extending into said salient pole from the air gap and defining a shaded portion of said pole, means establishing a relatively smooth exposed side on said shaded portion of said salient pole for ease of insulating the surface of said salient pole to receive a stator winding, said establishing means including a shading pole aperture in said shaded portion of said salient pole and closer to said exposed side of the shaded portion of said salient pole than said shading coil slot, and a shading coil surrounding substantially the entire shaded portion of said salient pole and having one shading coil side in said slot and another shading coil side in said aperture.

Accordingly, an object of the invention is to provide a shaded pole electric motor with a relatively smooth, exposed side for ease of insulating the surface of the salient pole to receive the stator winding.

Other objects and a fuller understanding of the invention may be had by referring to the following description and claims, taken in conjunction with the accompanying drawing.

DESCRIPTION OF THE PREFERRED EMBODIMENTS

Figure 1:
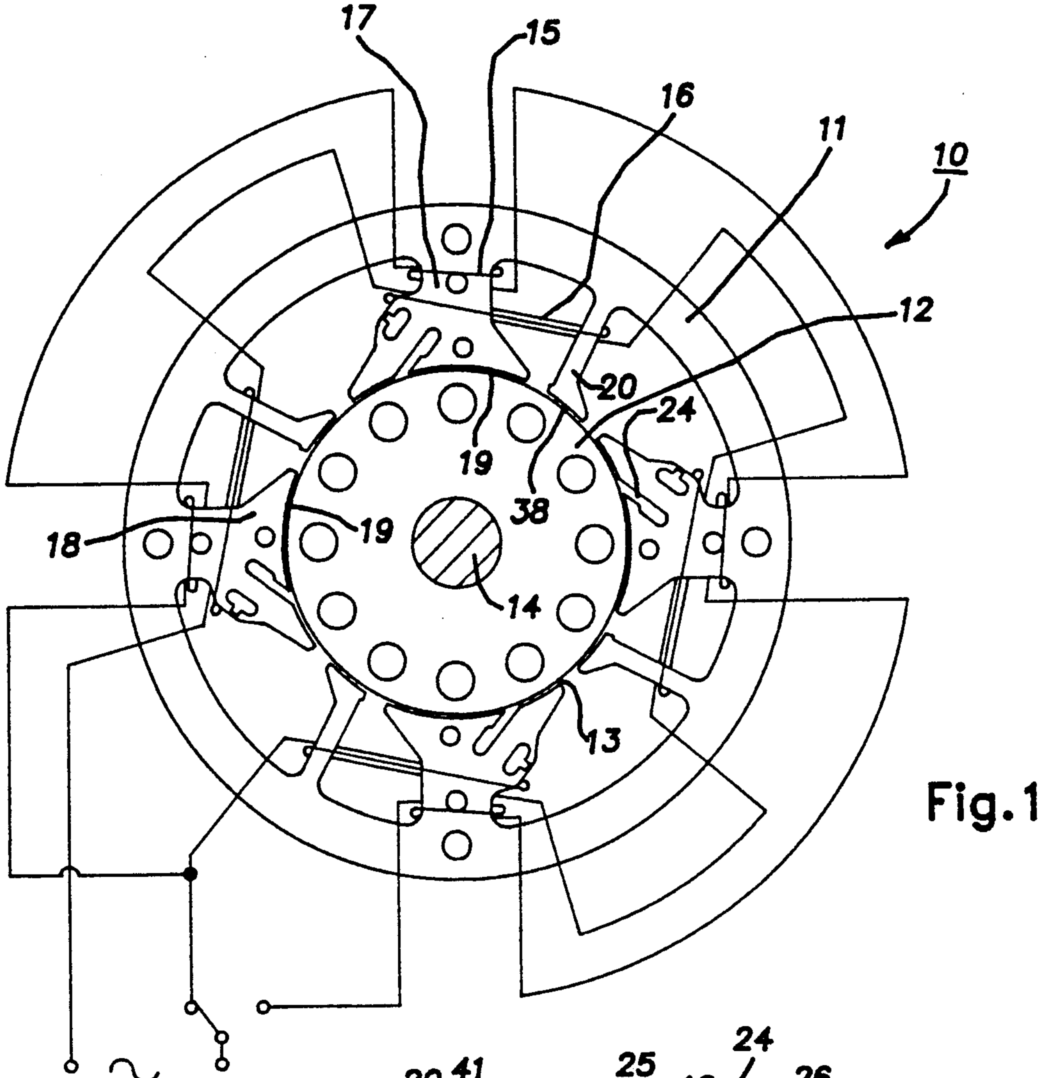
FIG. 1 is a schematic diagram of the improved shaded pole motor of the invention.

FIG. 1 illustrates an electric motor 10 embodying the present invention. This motor has a stator 11 and a rotor 12 which cooperate through an air gap 13. The rotor is mounted on a shaft 14, which is journaled in bearings (not shown) so that the rotor may rotate under influence of an energized stator winding 15 and 16. The stator winding 15 is wound on a narrow neck 17 of a pole piece 18 with a relatively wide pole face 19. The entire pole has tooth 20, with the stator winding 15 wound around the narrow neck 17 and the stator winding 16 wound around that narrow neck plus the tooth 20, to provide improved starting torque.

Figure 2:
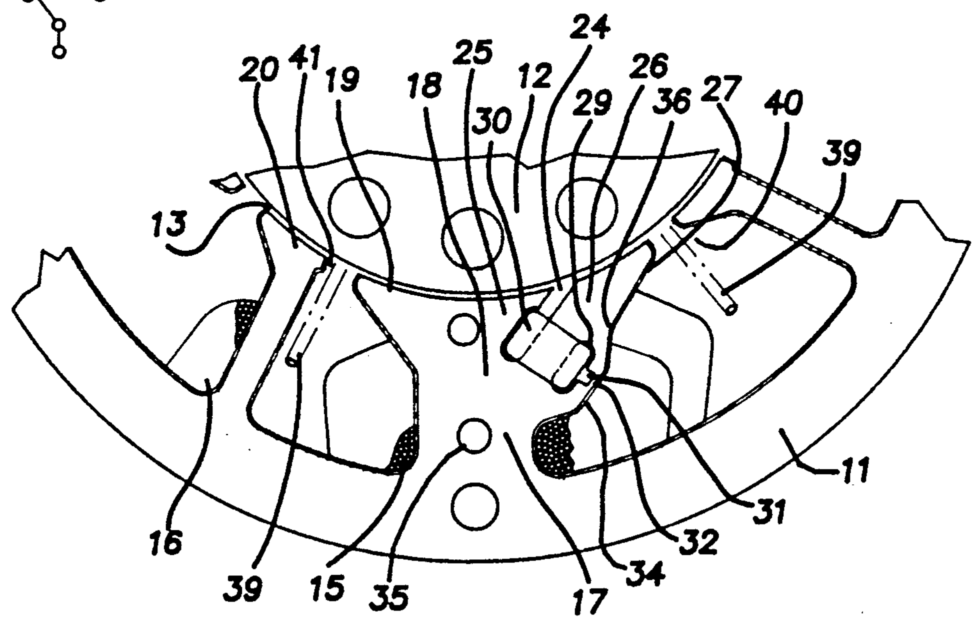
FIG. 2 is an enlarged drawing of one pole of the motor of FIG. 1.

A shading coil slot 24 extends into the salient pole piece 18 from the air gap 13, and defines a main portion 25 of the pole piece 18 and also defines a shaded portion 26 of the pole piece 18, see FIG. 2. This shaded portion 26 is defined on one side by the slot 24 and on the other side by an exposed side 27. The present invention includes a means establishing a relatively smooth, exposed side 27 on the shaded portion 26 for ease of insulating the surface of the salient pole to receive the stator winding 15 or 16. This smooth surface establishing means includes a shading pole aperture 29 generally opposite the shading coil slot 24 and just inboard of the exposed side 27. A shading coil 30, FIG. 2, is disposed with one shading coil side in the slot 24 and the other shading coil side in the aperture 29, and substantially surrounds the entire shaded portion 26 of the pole piece 18. In this embodiment, one area 31 of the shading pole aperture 29 extends outboard and quite close to the exposed side 27, but stops short of merging with the exposed side, by the saturable, magnetically permeable bridge 32 most of the space of the aperture 29 is enclosed by the shaded portion 26 including a relatively thin portion of the bridge 32 between the aperture 29 and the exposed side 27. The thin portion of the bridge 32 is smaller than the size of the aperture 29. The width of the area 31 is greater than the dimension of the air gap 13, which may be in the order of 0.010 inch, so that there is no recirculation of flux which would tend to diminish the lagging flux in the shaded portion 26, due to the short circuiting shading coil 30. The saturable bridge is thick enough to be a solid mechanical link between the radially outer and inner portions of the shaded portion 26, but thin enough to easily saturate during the normal stator winding energization, and thus not permit recirculation of the flux.

In order that the stator winding 15 or 16 does not short circuit to ground on the usually bare surface of the shading coil 30, an insulation layer 34 is provided on the stator 11, at least at the stator windings 15 and 16. This may be a molded bobbin; however, an insulation applied directly to the surface, as shown in FIG. 2, is more space-efficient and permits a shorter length of wire for a given number of turns in the stator winding 15, 16. The stator 11, it will be understood, is made of a number of laminations, and these may be held together by rivets in holes 35, or may be held together by insulation material in such holes 35. The insulation layer 34 may be applied, for example, by heating the stator lamination stack and dipping it into a fluidized bed of powdered insulation which will cling to the exposed surfaces of the stator, melt thereon, and later harden on these exposed surfaces to form an insulation layer 34. Alternatively, an electrostatic system may be used wherein the insulation powder is electrostatically charged positive, for example, and the lamination stack is negatively charged or grounded so that the powder is electrostatically attracted to the exterior surfaces of the stator. It is then heated to melt and then be solidified. The composition of the insulating layer 34 is not critical, and may be a suitable material known in the art. Also, an epoxy insulating coating, or even a layer of insulating paper, may be used for the winding slot insulation.

FIG. 2 especially shows that the exposed side 27 of the shaded portion 26 is relatively smooth so that the insulation layer 34 does not have to try to cover any of the shading coil, nor any sharp corners on the stator 11 so that the stator winding 15 and 16 can be received. It will be noted that the exposed side has radiused corners, as at 36, and has its surface areas adjacent the aperture 29 forming an included angle of about 150 degrees or more. The resulting obtuse corners between these surface areas are easy to insulate by any of the above-mentioned methods. By comparison, the smooth profile of the exposed side 27 permits a thickness of insulation 34 of, for example, 0.015", to be used, while prior art constructions have used as much as 0.031" thickness. Hence, the invention affords significant savings in materials. Also, the radiused corners and smooth exterior surface permit ready winding of the stator windings 15 and 16. Typically, this winding is accomplished in place on the pole piece 18 by a winding gun which has an arm 39. The winding gun itself moves along the shaft axis, with the rotor not in place, and the winding gun arm 39 extends through the space 40 between pole tips up and over the pole piece 18 and down through the next adjacent space 41, down underneath the pole piece 18 and back up through the space 40. All the time this winding gun arm is feeding a wire out of the winding gun arm 39 to wind around the pole piece 18. The smooth exposed side 27 permits the wire to smoothly be fed into place next to the narrow neck 17 rather than the possibility of this wire's catching on an exposed side of the shading coil, which was certainly possible in the prior art constructions.

Figure 3:
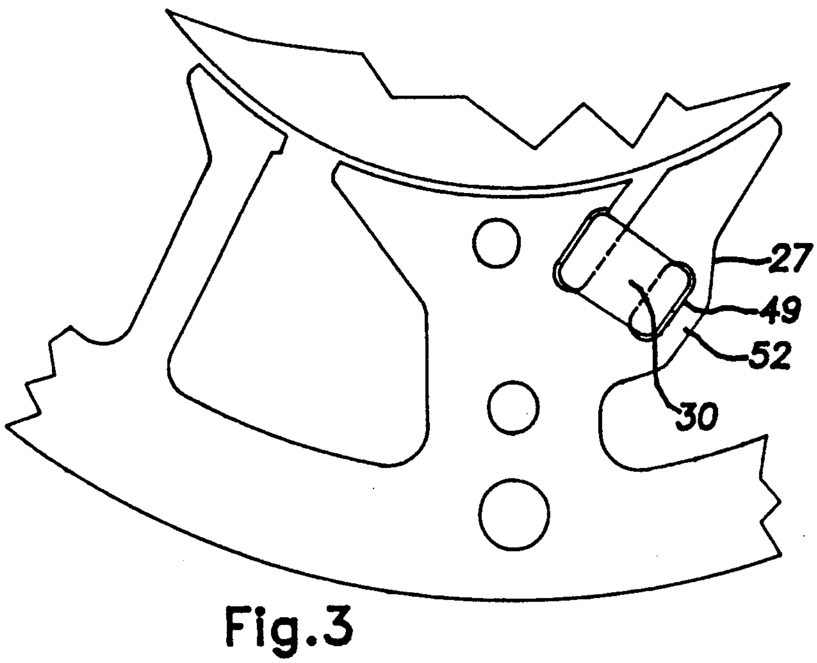
FIG. 3 is an enlarged drawing of a modification of the invention.

FIG. 3 illustrates a modification of the invention, wherein the shading pole aperture 49 is of an oval shape without any extending area, like area 31 of FIGS. 1 and 2. There is thus a magnetically permeable bridge 52 outboard of the shading coil 30, which has a coil side in the aperture 49. This magnetic bridge 52 provides the smooth, exposed surface, and may be made quite thin throughout its entire extent so as to minimize recirculation of flux. Again, this smooth, exposed side 27 is receptive to the insulation layer 34 (not shown).

Figure 4:
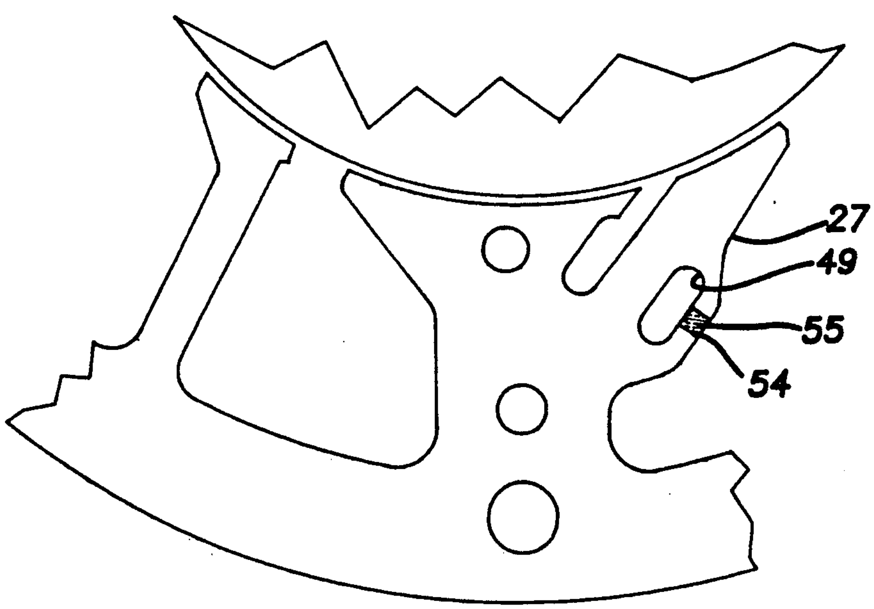
FIG. 4 is an enlarged drawing of a further modification of the invention.

FIG. 4 shows a further modification of the invention, wherein a second slot 54 extends from the shading pole aperture 49 to the exposed side 27. This second slot may be left open if a premolded bobbin is used which follows the contours of the smooth, exposed side 27, or may be filled with a wedge of non-magnetic material, e.g., a fiber glass wedge 55.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electric motor comprising a stator and a rotor interacting through an air gap;

said stator having a salient pole with a surface of the salient pole forming the profile of a narrow neck and a wide pole shoe;

a shaded coil slot extending into said salient pole from the air gap and defining a shaded portion of said pole;

an exposed side on said shaded portion of said salient pole;

a shading pole aperture in said shaded portion of said salient pole closer to said exposed side of the shaded portion of said salient pole than said shading coil slot, a space of the aperture being enclosed by the shaded portion of the salient pole including a relatively thin part of the shaded portion between the aperture and the exposed surface in said relatively thin part being substantially smaller than a size of the aperture whereby a relatively smooth shape is imparted to said exposed side of said salient pole for ease of insulating the surface of said salient pole to receive a stator winding; and a shading coil substantially surrounding the shaded portion of said salient pole and having one shading coil side in said slot and another shading coil side in said aperture.

2. An electric motor as set forth in claim 1, wherein said stator has a plurality of salient poles and said shaded portion is provided on each of said salient poles.

3. An electric motor as set forth in claim 1, wherein said exposed side has radiused corners and an included angle exceeding 150 degrees.

4. An electric motor as set forth in claim 1, wherein said aperture communicates through a non-magnetically permeable second slot with said exposed side.

5. An electric motor as set forth in claim 4, including a wedge of non-magnetically permeable material in said second slot.

6. An electric motor as set forth in claim 4, wherein said second slot is wider than said air gap.

7. An electric motor as set forth in claim 1, wherein said shaded portion includes means to minimize recirculation of flux outboard of said aperture.

8. An electric motor as set forth in claim 1, including a magnetically permeable bridge outboard of said aperture.

9. An electric motor as set forth in claim 8, including means to saturate said bridge under normal stator winding energization to minimize recirculation of flux outboard said aperture.

* * * * *